Aug. 26, 1969   R. W. PUTA ET AL   3,462,968
FREEZER WITH REMOTE REFRIGERATED SUPPLY AND DELIVERY
AND COOLING CONDUIT THEREFOR
Filed Sept. 13, 1968   2 Sheets-Sheet 1

Inventors
Ruben W. Puta
Carl R. Stoelting
By
J. Michael
Attorney

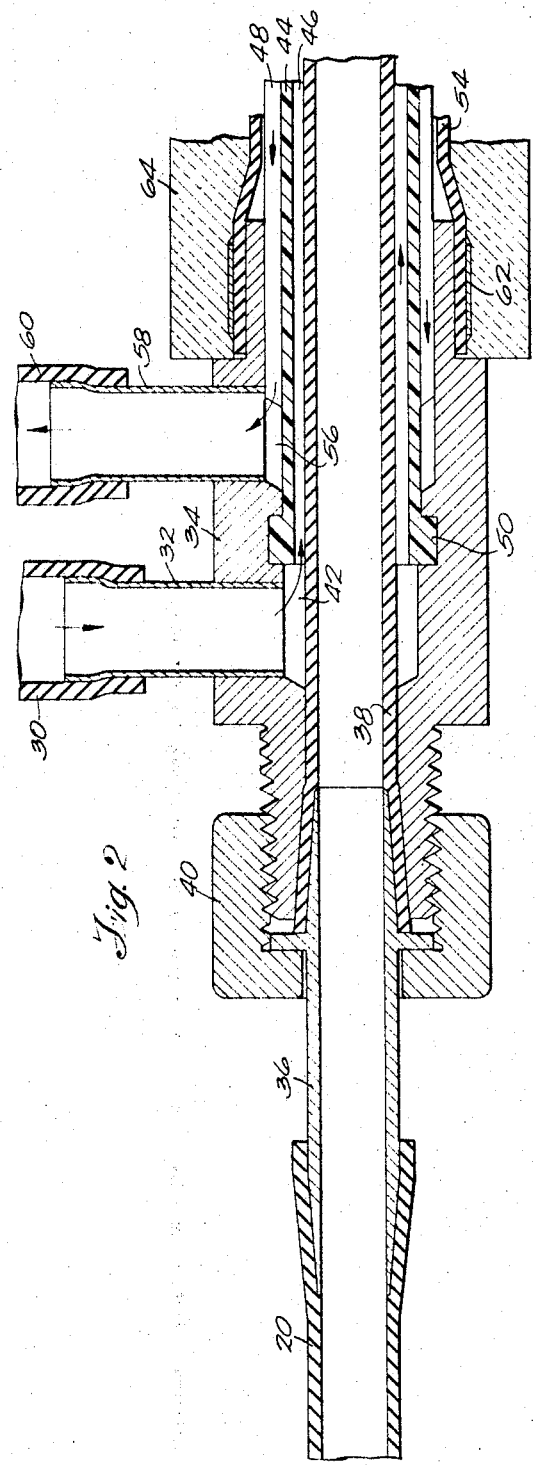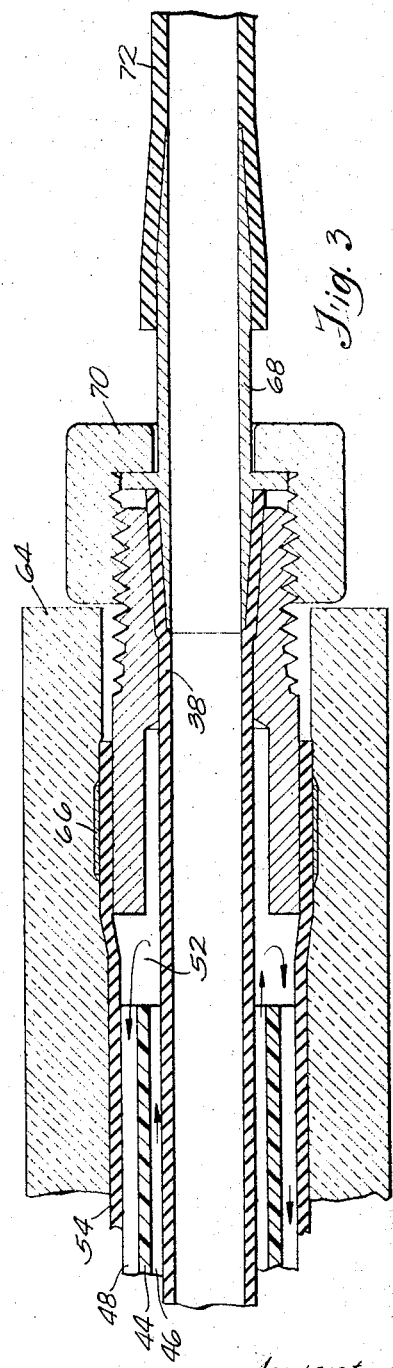

United States Patent Office 3,462,968
Patented Aug. 26, 1969

3,462,968
FREEZER WITH REMOTE REFRIGERATED SUPPLY AND DELIVERY AND COOLING CONDUIT THEREFOR
Ruben W. Puta, St. Nazianz, and Carl R. Stoelting, Kiel, Wis., assignors to Stoelting Brothers Company, Kiel, Wis., a corporation of Wisconsin
Filed Sept. 13, 1968, Ser. No. 759,611
Int. Cl. F25c 7/08; F28f 7/00
U.S. Cl. 62—348                                7 Claims

ABSTRACT OF THE DISCLOSURE

The supply of mix for the soft serve freezer is retained in the cooler and pumped to the freezer on demand. The hose through which the mix is supplied to the freezer is cooled by pumping cold water from the sump in the cooler through cooling coils and thence to the space between the ribbed tube surrounding the mix hose. The cold water flows to the delivery end of the mix tube and is returned on the outside of the ribbed tube in the space between the ribbed tube and the outside hose. Maximum water pressure is selected to be below the minimum mix pressure so any leakage can only be from the mix to the water. The couplings are designed to exert maximum pressure on the coupled hose at the inner extremity of the coupling to prevent the mix from creeping between the coupled hose and the fitting.

Background of invention

The better type soft serve freezers are supplied mix from a remote refrigerated space, usually a walk-in cooler. The mix is pumped through a tube or hose to the freezer and as product is withdrawn from the freezer additional mix is introduced to the freezer. Since the freezer may be located some distance from the cooler the amount of mix contained in the hose can become an appreciable factor under no draw conditions at which time the ambient air temperature can warm the mix up to the point where bacteria growth could be possible. Sanitary codes are being drawn to require that the mix temperature not rise above 45° F. with 100° F. ambient temperature. The prior arrangements will not meet this standard unless the freezer is backed up to the cooler or even partly built into the cooler.

Summary of invention

The present arrangement, by providing continuous cooling of the delivery hose, prevents undue increase in the mix temperature under the no draw conditions at the test temperature of 100° F. The present arrangement still allows the desirable feature of freedom of location of the freezer relative to the cooler and retains the flexible delivery hose to the freezer while permitting easy cleaning of the hose.

Description of drawings

FIG. 2 is a section through the inlet end of the delivery hose including the manifold arrangement for introducing and withdrawing water.

FIG. 3 is a section showing the outlet end of the hose and also illustrating the manner in which the water flow is turned around to pass back to the walk-in cooler.

Description of the preferred embodiment

Figure 1:
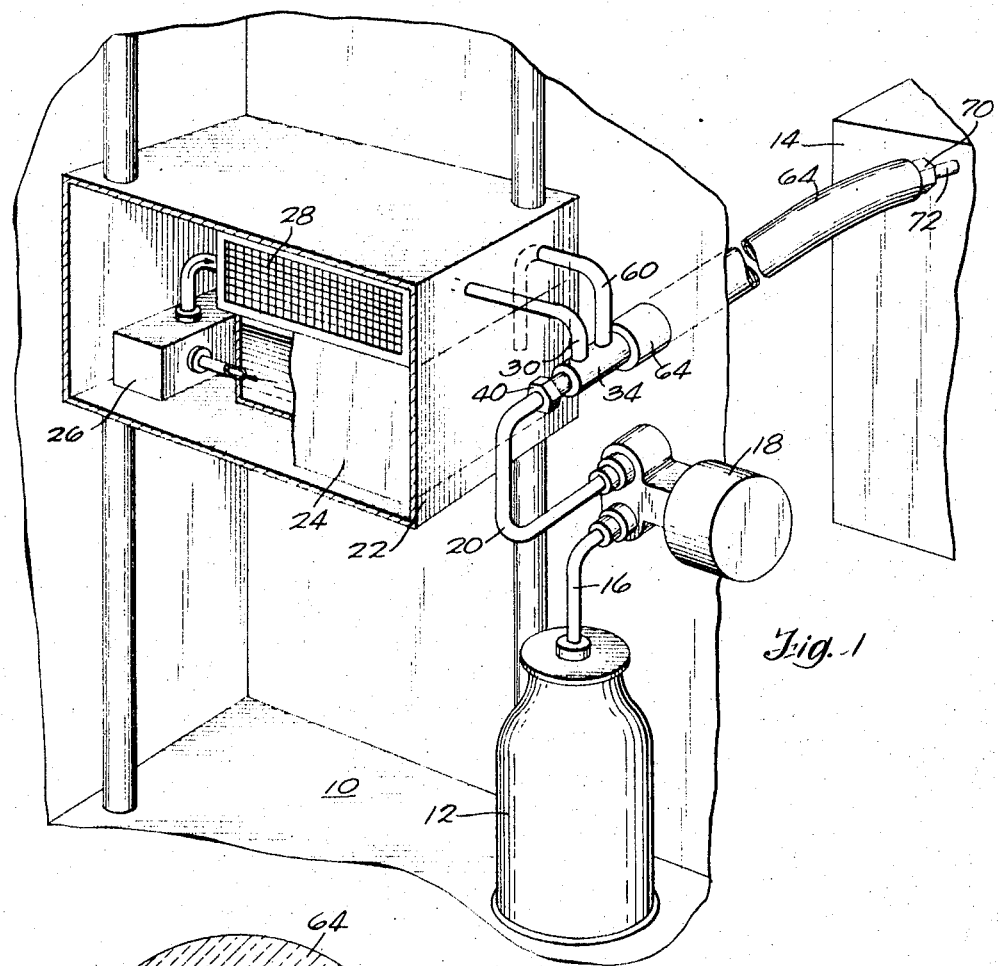
FIG. 1 is a partial, perspective view showing the relationship of the freezer to the walk-in cooler containing the mix can and cooled water supply.

In FIG. 1 the walk-in cooler is generally designated by the numeral 10 and, in accordance with the usual practice, the can 12 containing the soft serve mix is kept in this refrigerated space for delivery to the freezer 14 as product is withdrawn from the freezer. The customary arrangement provides for the hose 16 to be connected between the mix can and to the inlet of pump 18 which delivers the mix under pressure to hose 20. The walk-in cooler is provided with a sump tank 22 containing a supply of water 24 in which the pump 26 is submerged for delivery of water to the cooling coil 28 (over which a fan blows cool ambient air) and thence to the hose 30. Water is pumped constantly and the cooling chamber is generally kept at 40° F. or lower. In this arrangement, then, the water leaving the cooling coil 28 will be no more than 40.5° F.

Figure 4:
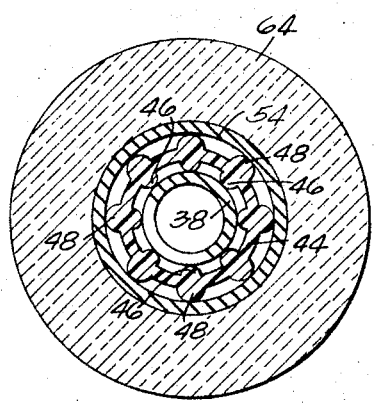
FIG. 4 is a vertical section through the hose assembly and particularly pointing out the inside and outside ribbed hose providing the inside and outside water jackets through which the cooling water flows.

The water delivery hose 30 is connected to inlet 32 projecting from manifold 34. The hose 20 delivering the mix from the mix pump is connected to the manifold inlet 36. The mix hose 38 is clamped in the manifold assembly by turning nut 40 down to capture the end of the hose between the generally complementary tapers on the fitting 36 and the inside of the manifold itself. The tapers are designed, however, so that the inner end will exert the greatest pressure on the hose and minimize leakage up along the joint. The water inlet 32 communicates with an annular chamber 42 surrounding hose 38 to the left (FIG. 2) of the end of the intermediate hose 44 which, as can be seen clearly in FIG. 4, is provided with internal ribs 46 and external ribs 48 to serve a spacing function. The manifold or left end of the intermediate ribbed hose is provided with a collar portion 50 which is received in the complementary groove in the manifold to anchor this end of the hose. The incoming water flowing into annular chamber 42 will enter the space between the intermediate hose and the mix hose 38 and will flow between the longitudinal ribs to the other end of the intermediate hose to communicate with the chamber 52 and re-enter the space between the intermediate hose 46 and the outside hose 54 for return to the manifold where it flows into the annular chamber 56 and thence into the outlet fitting 58 for return to the sump via hose 60. The outside hose 54 is connected to the manifold by means of hose clamp 62 and the hose is covered with an insulating cover 64. At the outlet end of the hose assembly the outside hose is also secured by a hose clamp 66 while the inside or mix hose 38 is clamped between the outlet fitting 68 and the cap nut 70; again, with the almost but not quite complementary tapers designed to secure maximum pinch on the hose at the left end of the outlet fitting 68. It will be appreciated then that the mix continues through the outlet fitting to the short piece of hose 72 connecting directly to the freezer inlet.

In the usual arrangement of this type the mix pump will have a delivery pressure varying between 9 and 21 p.s.i. and with this in mind the water circulating pump is selected to have a maximum pressure of 8 p.s.i. so that if there is any leak in the mix hose the leakage will be from mix to water rather than water into the mix.

This arrangement fully satisfies the sanitary codes and has proven successful in laboratory and field tests. The hoses are of plastic materials which permit rapid and thorough cleaning. It will be appreciated that with this arrangement the desirable flexibility in location of the freezer in the soft serve store is still retained while insuring a refrigerated mix supply right up to the freezer. Further, present units can be converted with a minimal expenditure by adding the water system and cooling hose assembly.

We claim:

1. The combination with a soft serve freezer of the type having a mix feed from a remote supply in a cooler by means of a pump delivering the mix to a hose connected to the freezer, of a means for cooling the delivery hose comprising,
   a refrigerated water supply in the cooler,
   an intermediate hose spaced from the mix hose and surrounding the mix hose,
   means connecting the refrigerated water supply to the space between the intermediate hose and the mix hose for circulation over the mix hose throughout its length between the cooler and the freezer and including a pump for delivering the water to the space,
   means for returning the water to the cooler for re-cooling.

2. The combination of claim 1 in which the return means comprises a hose outside of and spaced from the intermediate hose.

3. The combination of claim 2 including manifold means at each end of the intermediate hose to keep the various flow paths separate.

4. The combination of claim 3 including ribs on the inside and outside of the intermediate hose respectively in contact with the mix hose and the outside hose.

5. The combination of claim 4 in which the ribs are longitudinal.

6. The combination of claim 4 in which the refrigerated water supply comprises,
   a sump,
   a cooling coil,
   said pump delivering water from the sump to the cooling coil and thence to the manifold and the space between the intermediate hose and the mix hose.

7. Structure according to claim 3 in which the central hose is connected at the manifolds by means of tapered connections exerting maximum sealing pressure at the inner end of the taper.

References Cited

UNITED STATES PATENTS

| | | | |
|---|---|---|---|
| 2,896,421 | 7/1959 | Rader | 62—348 X |
| 3,141,573 | 7/1964 | Patch et al. | 62—392 X |

WILLIAM E. WAYNER, Primary Examiner

U.S. Cl. X.R.

62—392; 165—46